United States Patent [19]
Bohannon et al.

[11] Patent Number: 6,125,371
[45] Date of Patent: Sep. 26, 2000

[54] SYSTEM AND METHOD FOR AGING VERSIONS OF DATA IN A MAIN MEMORY DATABASE

[75] Inventors: Philip L. Bohannon, Mt. Tabor, N.J.; Dennis W. Leinbaugh, Columbus, Ohio; Rajeev Rastogi, New Providence, N.J.; Srinivasan Seshadri, Mumbai, India; Abraham Silberschatz, Summit, N.J.; Sundararajarao Sudarshan, Mumbai, India

[73] Assignee: Lucent Technologies, Inc., Murray Hill, N.J.

[21] Appl. No.: 08/914,744

[22] Filed: Aug. 19, 1997

[51] Int. Cl.[7] .................................................... G06F 17/30
[52] U.S. Cl. ............................................................ 707/203
[58] Field of Search ................................... 707/200, 201, 707/203, 206, 2

[56] References Cited

U.S. PATENT DOCUMENTS

| 5,317,731 | 5/1994 | Dias et al. | 707/203 |
| 5,745,905 | 4/1998 | Larsson et al. | 707/203 |
| 5,956,713 | 9/1999 | Bamford et al. | 707/8 |

OTHER PUBLICATIONS

Merchant, A et al. "Performance analysis of dynamic finite versioning schemes: storage cost vs. obselecence" Knowledge and Data Engineering, IEEE Transactions on, vol. 8, No. 6, Dec. 1996, pp. 985–1001.

Dias, D. M. et al. "An intelligent page store for concurent transaction and query processing" Resurch Issues on Data Engineering, 1992: Transactions ona query Processing, Second International Workshop, Feb. 1992 pp. 12–19.

Wu, K. et al. "Dynamic finite versioning: and effective versioning approach to concurrent transactions and query processing" Procedings Ninth International conference on Data Engineering, pp. 577–586, Apr. 1993.

Article entitled "Concurrency Control in a Dynamic Search Structure" by Udi Manber, Richard E. Ladner University of Washington, 1982, pp. 268–282.

Article entitled "Concurrent Manipulation of Binary Search Trees" by H.T. Kung and Philip L. Lehman of Carnegie–Mellon University, 1980, pp. 354–382.

*Primary Examiner*—Jack M. Choules

[57] ABSTRACT

For use with a database of data records stored in a memory, a system and method for increasing a memory capacity and a memory database employing the system or the method. The system includes: (1) a time stamping controller that assigns a time stamp to transactions to be performed on the database, the time stamp operates to preserve an order of the transactions, (2) a versioning controller that creates multiple versions of ones of the data records affected by the transactions that are update transactions and (3) an aging controller, which is associated with each of the time stamping and versioning controllers, that monitors a measurable characteristic of the memory and deletes ones of the multiple versions of the ones of the data records in response to the time stamp and the measurable characteristic thereby to increase memory capacity.

20 Claims, 4 Drawing Sheets

SYSTEM AND METHOD FOR AGING VERSIONS OF DATA IN A MAIN MEMORY DATABASE

TECHNICAL FIELD OF THE INVENTION

The present invention is directed, in general, to database management systems and, more specifically, to a system and method for aging versions of data records in a main memory database.

BACKGROUND OF THE INVENTION

Many contemporary application tasks use database systems to store, retrieve and, even, process data. Database systems typically include a database manager ("DBM") and a database (i.e., a data repository). A DBM is a control application that supervises or manages interactions between application tasks and the database. Such supervision and management vary among DBMs based on a given DBM's sophistication and the database's intended use. Arguably, two of the most important DBM functions are those that ensure data recovery (in response to a database crash) and data integrity.

Data recovery involves rebuilding at least part of a database after all or part of its data is corrupted/lost, such as caused by a power outage, a program crash, or the like. If certain data is corrupted/lost, the DBM will "recover" at least the portion affected; recovery is usually to a last known valid or "uncorrupt" state. When database recovery efforts are undertaken, extended time delays are expected.

With respect to data integrity, however, time delays or latencies (time differential between a request for data and actual receipt of the same) are largely intolerable. Early database systems were divided among main (volatile) and disk (non-volatile) memory; DBMs and application tasks resided, at least in part, in volatile memory, while the database was stored in non-volatile memory. Such systems, and their "disk"-based successors, have failed to meet performance requirements of contemporary high-speed information management systems ("IMSs," such as communications switching systems). This has frequently been due to latencies inherent to non-volatile memory transactions (e.g., accesses, retrievals, modifications, indices, copies, etc.), exacerbated by data integrity techniques.

Contemporary IMSs demand fast and predictable transaction response times, particularly for transactions that do not modify or otherwise change a given database ("read-only transactions"). One popular methodology maps the entire database into volatile memory (a "main memory database") to improve IMS performance, particularly transaction response times. Unfortunately, to ensure data integrity, conventional main memory DBMs delay the processing of transactions that modify portions of the database (termed "update transactions") until other transactions with respect to such portions are processed. For instance, if two transactions attempt to access the same file, entry, field, or the like (collectively, a "data record") simultaneously, contemporary DBMs ensure data integrity by preventing an update transaction from modifying the data record while the other relies on the contents of the same.

Database modifications however generally affect a small number of data records only. Typically, a DBM monitors a status of a data record that is the subject of an update transaction and grants a right to modify the same to the update transaction only when the data record is free (not otherwise being used or relied upon by another transaction). This right is commonly either a lock (i.e., control mechanism that prevents other transactions from getting to the same data records) or a latch (i.e., a semaphore—control mechanism that sends a message to other transactions indicating that another transaction is modifying or changing these data records), causing other transactions to "wait" to see the affected data record while the update transaction modifies the same.

Update transactions tend to be multi-step processes. As such, it is quite common for a DBM to require a given update transaction to wait between process steps while other update transactions complete. While waiting, the update transaction retains its data record locks or latches; these other update transactions also maintain their data record locks and latches. This can lead to interdependency conflicts that require DBM intervention to resolve.

Therefore, while main memory databases have increased speed, the above-described "waits" and conflicts provide a source of unpredictability to transaction throughput and database response time. This is particularly true for read-only transactions, requiring a simple "look and see" database access that may be severely delayed because of the same.

Contemporary control methodologies reduce conflicts between update and read-only transactions, giving the latter consistent, but "old" or out-of-date, views of certain data records or data record types. This is commonly referred to as multi-versioning, in which DBMs retain or archive multiple versions of recently updated data records for use by read-only transactions. Multi-version DBMs use time stamps to serialize read-only and update transactions, and, more recently, to serialize read-only transactions with respect to update transactions. These DBMs require update transactions to perform locking to serialize themselves with respect other update transactions, but not read-only transactions.

Multi-versioning techniques, while reducing "waits" and conflicts among transactions, often conflict with DBM efforts to utilize main memory capacity efficiently. As main memory remains significantly more expensive than disk memory, main memory DBMs continuously expend processing resources collecting or "ageing" old and no longer needed data record versions, regardless of main memory utilization. Contemporary versioning schemes fail to appreciate the various costs associated with collecting such data record versions, particularly failing to understand a tradeoff between ensuring continual and optimal main memory capacity and an efficient use of processing resources. Therefore, a need exists in the art for an efficient means of reclaiming main memory space no longer used by such multi-version techniques—to age, logically and economically, data record versions in a main memory database.

SUMMARY OF THE INVENTION

To address the above-discussed deficiencies of the prior art, the present invention provides, for use with a database having a plurality of data records, systems and methods that efficiently monitor and adaptively increase data capacity in a database. The present invention introduces the broad concept of efficiently and effectively freeing allocated volatile memory through aging to timely increase the data capacity of the database.

An advantageous embodiment of the system includes each of a time stamping controller, a versioning controller and an aging controller. The time stamping controller assigns a time stamp to transactions to be performed on the database as a function of a time stamp counter. The time stamp operates to preserve an order of the transactions. The versioning controller creates multiple versions of data records of the database that are affected by update transactions. The time stamping and versioning controllers cooperate to allow read-only transactions to be performed on the database without requiring data record locks or latches. The aging controller, which may be associated, directly or indirectly, with each of the time stamping and versioning controllers, monitors at least one measurable characteristic (such as current utilization or capacity of main memory) and deletes prior ones of the multiple data record versions in response to the time stamp and the at least one measured characteristic to thereby increase the data capacity of the database, increasing memory capacity.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings wherein like numbers designate like objects, and in which.

DETAILED DESCRIPTION

Figure 1:
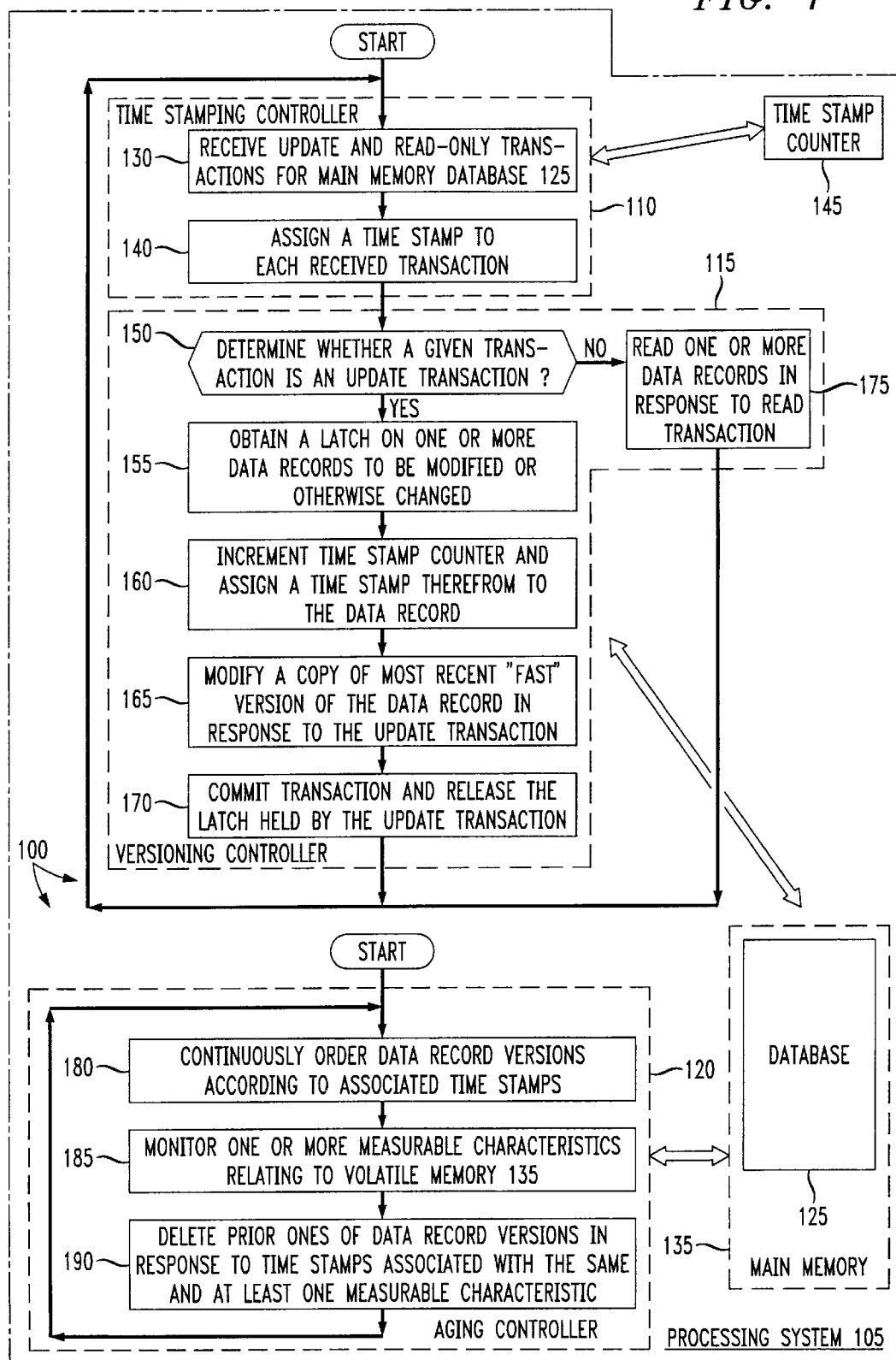
FIG. 1 illustrates a flow diagram of an exemplary method for controlling multi-versioned data records according to the present invention.

Before undertaking a detailed description of an advantageous embodiment of the present invention, it may be beneficial to discuss the general concept of creating and maintaining multiple versions of data records, known in the art as multi-versioning or, simply, "versioning."

Note that the phrase "data record," as used herein, is defined broadly to mean any file, entry, record, field, item and other data associated with at least one database (or any suitable data repository for that matter); the phrase "associated with," and derivatives thereof, as used herein, may mean to include within, interconnect with, contain, be contained within, connect to or with, couple to or with, be communicable with, juxtapose, cooperate with, interleave, be a property of, be bound to or with, have, have a property of, or otherwise cooperate in accordance with the principles of the present invention or an embodiment incorporating the same; the term "include," and derivatives thereof, mean inclusion without limitation; and the term "or" is inclusive, meaning and/or.

Furthermore, while the following discussion relates to databases residing in the main memory of a computer, those skilled in the art should understand that the broad principles and scope of the present invention extend to databases contained in other-than-main memory, such as secondary or mass storage units.

In main memory database systems supporting versioning, transactions are commonly classified as one of read-only (e.g., a transaction that "reads" data records) or update (e.g., a transaction that "updates" data records or, more broadly, wants access to a current version of a particular data record). When an update transaction, T, is executed, it most often updates a given data record—a "current" version of the data record is archived, becoming a most recent "past" version thereof, and the newly updated version becomes the new "current" (or successor) version of the same. Update transactions commonly use a two step locking protocol—a lock is obtained before any modification, or other change, is made to the data record; the data record is modified, making it the most recent past version and creating the new current version. Finally, when the update transaction commits, the data record affected is assigned a time stamp tsn(T) and the lock held by the update transaction is released.

At execution, a read-only transaction is commonly assigned a time stamp, tsn (T). A given read-only transaction reads the version of a particular data record whose time stamp is less than or equal to its time stamp.

When a given data record version is no longer needed by current (or future) transactions, it may be deleted and the memory space associated therewith reclaimed ("aging the version"). An older version can be aged if no read-only transaction exists: (1) having a time stamp greater than or equal to the time stamp associated with the older version and (2) smaller than the time stamp associated with the next data record version of the older version.

Turning now to FIG. 1, illustrated is a flow diagram of an exemplary method (generally designated 100) of a versioning manager for controlling multi-versioned data records according to the present invention. It should be noted that the embodiment of FIG. 1, like subsequent FIGS. 2 to 5, is introduced to illustrate the principles of the present invention only.

Version manager 100 may be software-based and executable by any suitably arranged processing system 105 (e.g., a computer, communications switch, etc.). Version manager 100 includes three controllers, namely, a time stamping controller 110, a versioning controller 115 and an aging controller 120. Those skilled in the art should be familiar with the use of controllers in processing environments generally and, more specifically, with main memory databases. Controllers may be implemented in software, firmware, hardware, or some suitable combination of at least two of the three.

To begin, exemplary time stamping controller 110 receives update and read-only transactions for a main memory database 125, step 130; exemplary main memory database 125 is stored in a volatile memory 135, which is suitably associated with processing system 105. In response, time stamping controller 110 assigns a time stamp to each received transaction, step 140. Time stamps are assigned to read-only transactions as a function of a time stamp counter 145, that is also a controller. Versioning manager 100 may advantageously use the time stamps to preserve an order of such received transactions. According to an advantageous embodiment, time stamp counter 145 is associated with a conventional system clock (not shown) of processing system 100.

For each transaction, exemplary versioning controller 115 determines whether a given transaction is an update transaction, decisional step 150. If the transaction is an update transaction, YES branch of decisional step 150, then versioning controller 115 (1) obtains a "X" lock on one or more data records to be modified (or otherwise changed), step 155, (2) modifies a copy of the most recent "past" version of the data record in response to the update transaction, creating a new "current" or "successor" version, step 165 and (3) commits the transaction, at which time it increments time stamp counter 145, assigns a time stamp therefrom to the new "successor" versions of the updated data records and releases the "X" lock held by the update transaction, step 170.

The foregoing exemplary commit processing steps 155 to 170 allow time stamping and versioning controllers 110 and 115 to cooperate to allow read-only transactions to be performed on main memory database 125 without record locks. Version controller 115 physically versions the data record (exemplary steps 160 to 170) in response to performing the update. This causes the versioned data record to be unreachable by future read-only transactions. Thus, if the transaction is a read-only transaction, NO branch of decisional step 150, then versioning controller 115 accesses database 125 and reads one or more data records stored therein in response to the read-only transaction and, in particular, the time stamp associated therewith by time stamp controller 110, step 175. The read-only transaction may only read records having a time stamp that is less than the time stamp associated with the transaction.

Exemplary aging controller 120, which is associated with each of time stamping and versioning controllers 110 and 115, monitors main memory database 125 to (1) continuously order (e.g., sort, arrange, etc.) multiple versions of ones of the data records according to their associated time stamps, step 180 and (2) monitor one or more measurable characteristics describing, relating to, or otherwise associated with a utilization or capacity of main memory 135, step 185. Exemplary aging controller 120 deletes prior ones of the multiple versions of the data records in response to the time stamp associated with the ones of multiple versions and at least one measurable main memory characteristic, step 190.

It should be noted that a primary difference between logical aging according to the present invention (responsive to a measurable main memory characteristic) and physical aging (generally known in the art), occurs when a read-only transaction ceases to see a particular data record version; more particularly, data that is visible to a given read-only transaction may not be logically aged for the duration of that transaction, while data visible to a read-only transaction during a reading operation cannot be physically aged for the duration of that operation.

Figure 2:
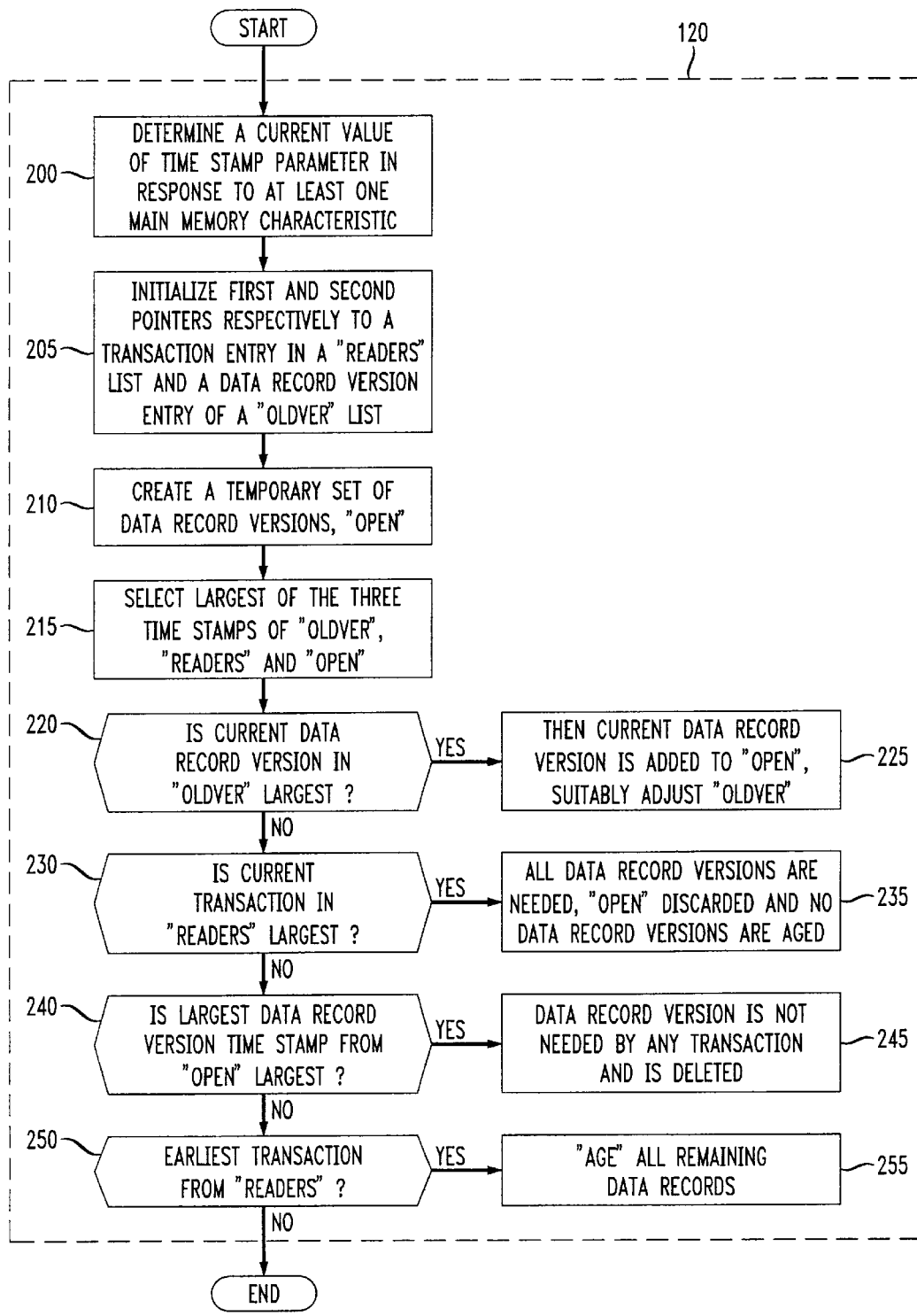
FIG. 2 illustrates a flow diagram of an exemplary method for logically aging multi-versioned data records according to FIG. 1 and the principles of the present invention.

Turning now to FIG. 2, illustrated is a flow diagram of an exemplary method of an embodiment of the aging controller (generally designated 120) of FIG. 1 for logically aging multiversioned data records according to the principles of the present invention. For purposes of illustration, the description of FIG. 2 concurrently references the embodiment of FIGS. 1 and 3 (introduced momentarily). Exemplary aging controller 120 assumes a sorted time stamped linked list of transactions ("readers"), and a linked list of non-current data record versions ("oldver"), preferably sorted by the time stamp of the transaction that created the new current or successor version of the same (i.e., referred to as a "finish time" of the data record version).

As described with reference to exemplary steps 155 to 170 hereinabove, execution of a given update transaction by aging controller 120 causes the "past" version of the data record to be added into a list, here physical list "oldver." By appending to the "oldver" list an entry containing a pointer to the data record version aged and its associated time stamp counter 145 indicating when it was aged (i.e., the finish time—after the past data record version was unlinked and time stamp counter 145 was incremented, exemplary step 160), aging controller 120 can selectively delete the same upon a determination that no read-only transaction has a time stamp less than this data record version's time stamp (exemplary step 190).

Figure 3:
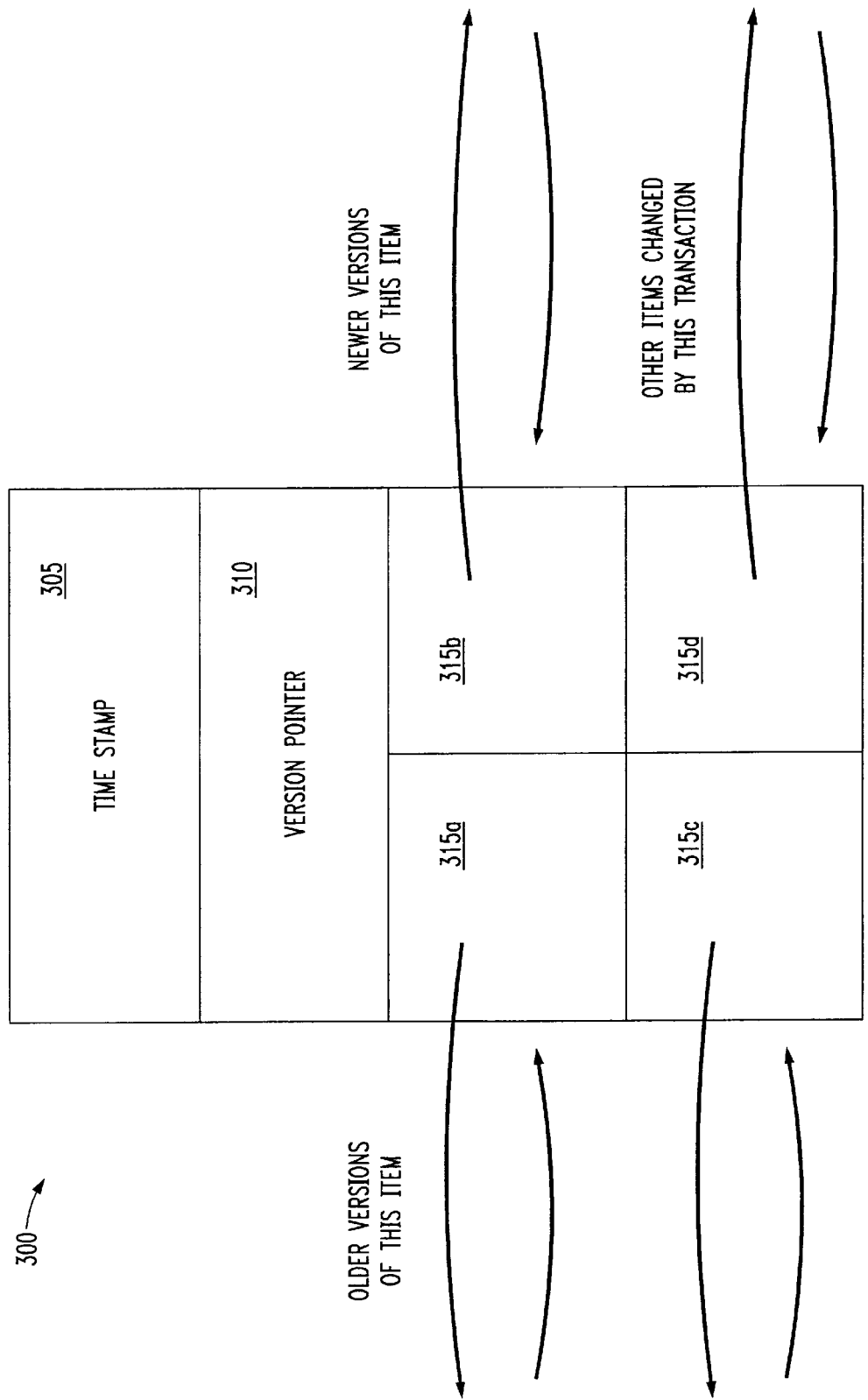
FIG. 3 illustrates a block diagram of an exemplary data structure used to maintain links to predecessor and successor data record versions according to the embodiments of FIGS. 1 and 2.

Turning momentarily to FIG. 3, illustrated is a block diagram of an exemplary data structure, or a version list entry ("VLE"), (generally designated 300) that may be used to maintain links to predecessor and successor data record versions and other information according to the illustrated embodiment. Exemplary VLE 300 includes a time stamp record 305, a version pointer 310 and a plurality of "other" pointers 315. Exemplary time stamp record 305 stores a time stamp as described hereinabove. Exemplary version pointer 310 maintains a pointer to a particular data record version. Exemplary "other" pointers 315 point to predecessor and successor data record versions, and possibly other data records modified or otherwise changed by a given transaction.

Returning now to FIG. 2, because main memory database 125 likely includes millions of data records, a substantial majority of which will include only one data record version, it is advantageous to dynamically allocate and free VLEs 300 as needed for data record versions. As a prelude, exemplary aging controller 120 marks for collection (or "ages") and deletes data record versions (freeing or deallocating their associated VLEs 300) having a "finish" time stamp less than a time stamp parameter, L, that is responsive to one or more measurable main memory characteristics. L may change over time (adapt) and provides suitable indicia of how aggressively predecessor data record versions should age.

To begin, aging controller 120 determines a current value of L in response to one or more measurable main memory characteristics, step 200, such as a current utilization or capacity of main memory, a trend analysis of a utilization or capacity of main memory over a time period (t), or any other applied mathematics- or statistics-based analysis, including a comparison of any of the same with a threshold, ceiling/floor, limit, set point or the like. Exemplary step 200 may be performed executed in response to completing a transaction, alternatively, it may be performed periodically, a periodically, regularly, irregularly, randomly or otherwise as is appropriate to a given aging controller 120 embodiment. Although illustratively performed by aging controller 120, step 200 may alternatively be performed elsewhere and communicated to aging controller 120.

Aging controller 120 initializes a first pointer to a transaction entry of the "readers" list having the largest time stamp that is less than L, and a second pointer to a data record version entry of the "oldver" list having the largest finish time stamp that is less than L, step 205. Aging controller 120 creates a temporary set (a linked list) of data record versions, "open," step 210.

Aging controller 120 backwards traverses the "readers" and "oldver" lists to the respective beginnings thereof, inserting data record versions into "open" that are not needed by transactions of the "reader." More particularly, as aging controller 120 performs this traversal, it continuously selects the largest of three time stamps, (1) the finish time of the current data record version in the "oldver" list, (2) the time stamp of the current transaction in the "readers" list and (3) the largest data record version time stamp in "open," step 215.

Depending on which of the three time stamps is largest, one of the following actions is performed: (1) if the finish time of the current data record version from "oldver" is the largest, YES branch of decisional step 220, then the current data record version is added to "open," and the second pointer is moved down the list by one toward data record versions having earlier finish times, step 225; (2) if the time stamp of the current transaction from "readers" is the largest, YES branch of decisional step 230, then all data record versions currently in "open" are needed by the current transaction, so "open" is discarded and none of the data record versions in it are aged, step 235; (3) if the largest data record version time stamp from "open" is the largest, YES branch of decisional step 240, then the data record version is not needed by any transaction, and the data record version with the largest time stamp is aged and deleted from "open," step 245; and (4) if the earliest transaction from "readers" is encountered, YES branch of decisional step 250, then all remaining data record versions are "aged," step 255.

Thus, according to the illustrated embodiment, aging controller 120 preferably "ages" non-viable or useless data record versions having a finish time less than L. If L adaptively increases, then aging controller 120 more aggressively attempts to free storage, most advantageously making a single pass through each of the "readers" transaction and "oldver" data record version lists—preferably simultaneously traversing the "readers" and "oldver" lists using pointers to current entries in the respective lists.

As mentioned hereinabove, in a main memory database versioning scheme, the efficiency of collecting old versions that are no longer needed is a tradeoff between space and time: if less time is spent to find "unneeded" data record versions, the more "unneeded" data record versions that remain and occupy valuable main memory space. To balance these contradictory goals, the principles of the present invention employ one or more measurable characteristics to vary a level of "eagerness"—by tying the same to utilization/capacity characteristics about main memory usage. Finding "unneeded" data record versions typically has a lower priority when memory is plentiful, but becomes increasingly aggressive as memory resources become scarce. In other words, aging controller 120 adaptively detects "unneeded" data record versions—adapting in response to a current utilization/capacity or utilization/capacity trend/pattern of main memory 135.

According to an advantageous embodiment, if a data record has but a single version, then it may advantageously be stored "as is," without VLE 300. VLEs 300 may be dynamically allocated as successor versions of data records are created (each VLE represents one data record version). A plurality of VLEs 300 associated with a given data record are linked together as a doubly-linked list ordered by time stamp (i.e., exemplary pointers 315*a*, 315*b*). Read-only transactions can traverse VLE "chains" to find a particular version of a given data record. Each VLE 300 may be found on a list of other versions created by a common transaction while the common transaction was active (i.e., exemplary pointers 315*c*, 315*d*), facilitating updates to time stamps 305 of versions created by the common transaction when it commits; deletions, if given transaction aborts, of data record versions created by the transaction; or otherwise.

Figure 4:
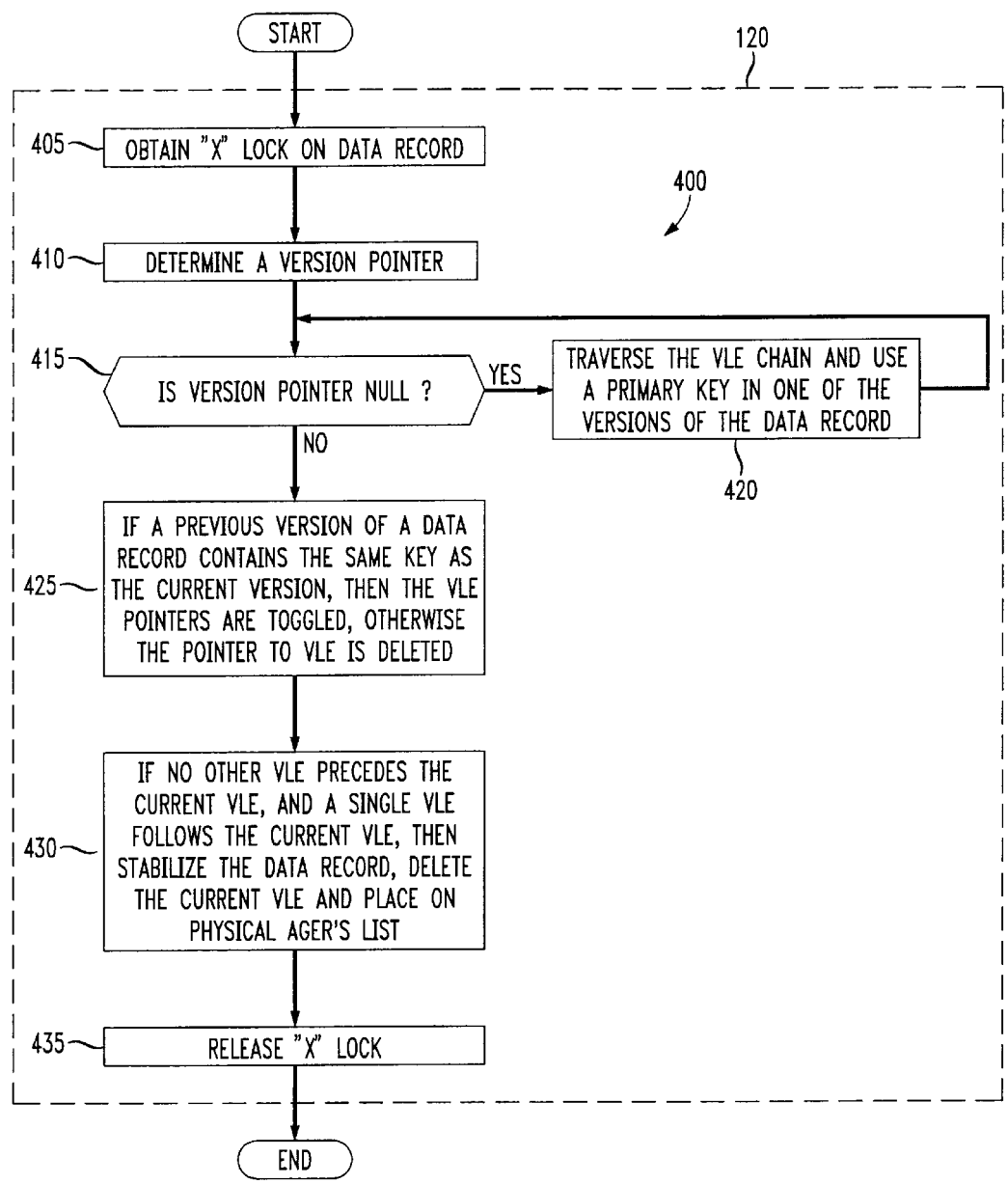
FIG. 4 illustrates a flow diagram of an exemplary method for "stabilizing" linked list data structures associated with the embodiments of FIGS. 1 to 3.

Turning now to FIG. 4, illustrated is a flow diagram of an exemplary method (generally designated 400) of operating a controller for "stabilizing" the linked list data structure associated with methods 100 and 120. For purposes of illustration, the description of FIG. 4 concurrently references the embodiments of FIGS. 1 to 3; more particularly, method 400 is suitably associated with, and either directly or indirectly controlled by, aging controller 120.

As described hereinabove, a data record version is added to "open" (a linked list of VLEs 300 associated with data record versions to be aged) when aging controller 120, as a function of L, fails to find a transaction having a time stamp between a given VLE's time stamp and a time stamp associated with the data record version following the same in the VLE chain. According to the illustrated embodiment, in addition to ensuring that data record versions that are no longer required are deleted and their associated memory freed, aging controller 120 also stabilizes the VLE 300 linked list data structure, and substructures, by removing a VLE 300 link associated with the data record version that is no longer needed and toggling pointer/indices to point to the version instead of VLE 300.

To begin, aging controller 120 obtains an "X" latch on a data record marked for deletion, as described hereinabove, to ensure that no transaction is accessing the same, step 405. Aging controller 120 identifies a version pointer, or primary key, for the data record version from the version pointed to by VLE 300, step 410. If the version pointer in VLE 300 is null, YES branch of decisional step 415, then aging controller 120 traverses the associated VLE chain and a primary key contained in one of the data record versions is used, step 420. If aging controller 120 determines that the version pointer in VLE 300 is not null, NO branch of decisional step 415, then for every index that contains a pointer to VLE 300, if a previous data record version contains the same key value as the "current" data record version, then the pointer to VLE 300 in the index is toggled to the previous data record version's VLE 300, else the pointer to VLE 300 is deleted from the index, step 425.

If no other VLE 300 precedes the current VLE and a single VLE 300, v', follows VLE 300 in the VLE chain for this data record version, then aging controller 120 stabilizes the data record as follows: (1) if the version pointer in v' is not null, and a previous data record version contains the same key value as the current data record version, then the pointer to v' in every index is toggled to the version pointed to v', the pointer to the VLE is deleted from the index; (2) v' is placed on the physical ager's list, and deletes VLE 300 from the VLE chain for the data record and both VLE 300 and the version pointer it points to (assuming not null) are placed in "open," step 430. Aging controller 120 releases the "X" lock, step 435.

In addition to the foregoing, conventional communications principles and theories are discussed in *The Irwin Handbook of Telecommunications*, by Green, Irwin. Professional Publishing (2nd ed. 1992); conventional processing systems and their architecture are more fully discussed in *The Indispensable PC Hardware Book*, by Messmer, Addison Wesley (2nd ed. 1995) and *Computer Organization and Architecture*, by Stallings, MacMillan Publishing Co. (3rd ed. 1993); and conventional electronic circuit design is more fully discussed in *The Art of Electronics*, by Horowitz and Hill, Cambridge (2nd ed. 1989). Each of the foregoing publications is incorporated herein by reference for all purposes as if fully set forth herein.

Although the present invention and its advantages have been described in detail, those skilled in the art should understand that they can make various changes, substitutions and alterations herein without departing from the spirit and scope of the invention in its broadest form.

What is claimed is:

1. A processing system for use with a database of data records, said database stored in a memory, comprising:
   a time stamping controller that assigns a time stamp to transactions to be performed on said database;
   a versioning controller that creates multiple versions of ones of said data records affected by said transactions that are update transactions; and
   an aging controller that monitors a measurable characteristic of said memory and deletes ones of said multiple versions of said ones of said data records in response to said time stamp and said measurable characteristic thereby to increase a capacity of said memory.

2. The processing system as recited in claim 1 wherein said time stamp is generated as a function of a time stamp counter.

3. The processing system as recited in claim 2 wherein said system increments said time stamp counter.

4. The processing system as recited in claim 1 wherein said time stamping controller reads said time stamp via a pointer.

5. The processing system as recited in claim 1 wherein a time stamp parameter is determined as a function of said measurable characteristic and said aging controller deletes ones of said multiple versions of said ones of said data records as function of said time stamp parameter.

6. The processing system as recited in claim 5 wherein said time stamp parameter adapts over a time period thereby to change a rate at which said ones of said multiple versions age.

7. The processing system as recited in claim 1 wherein said time stamp is contained within a version list entry, said version list entry containing pointers to related data record versions affected by said transactions.

8. A method of operating a processing system for use with a database of data records, said database stored in a memory, comprising the steps of:
   assigning a time stamp to transactions to be performed on said database;
   creating multiple versions of ones of said data records affected by said transactions that are update transactions;
   monitoring a measurable characteristic of said memory; and
   deleting ones of said multiple versions of said ones of said data records in response to said time stamp and said measurable characteristic thereby to increase a capacity of said memory.

9. The method as recited in claim 8 wherein said time stamp is generated as a function of a time stamp counter.

10. The method as recited in claim 9 further comprising the step of incrementing said time stamp counter.

11. The method as recited in claim 8 further comprising the step of reading said time stamp via a pointer.

12. The method as recited in claim 8 further comprising the steps of:
    determining a time stamp parameter as a function of said measurable characteristic; and
    deleting ones of said multiple versions of said ones of said data records as function of said time stamp parameter.

13. The method as recited in claim 12 further comprising the step of adapting said time stamp parameter over a time period thereby to change a rate at which said ones of said multiple versions age.

14. The method as recited in claim 8 wherein said time stamp is contained within a version list entry, further comprising the step containing pointers to related data record versions affected by said transactions in said version list entry.

15. A main memory database system, comprising:
    a database of data records stored in a main memory; and
    a main memory database management system, including:
       a transaction processing controller that receives and processes transactions on ones of said data records, said transactions classified either update or read-only,
       a data record latching controller, associated with said transaction processing controller, that allows ones of said data records to be latched as a function of said update transactions,
       a time stamping controller, associated with said transaction processing controller, that assigns a time stamp to transactions to be performed on said database as a function of a time stamp counter,
       a versioning controller, associated with said time stamping controller, that creates multiple versions of ones of said data records affected by said update transactions, and
       an aging controller, associated with each of said time stamping and versioning controllers, that monitors a measurable characteristic of said main memory and deletes ones of said multiple versions of said ones of said data records in response to said time stamp and said measurable characteristic thereby to increase a capacity of said main memory.

16. The main memory database system as recited in claim 15 wherein said main memory database management system increment said time stamp counter.

17. The main memory database system as recited in claim 15 wherein said time stamping controller reads said time stamp via a pointer.

18. The main memory database system as recited in claim 15 wherein a time stamp parameter is determined as a function of said measurable characteristic and said aging controller deletes ones of said multiple versions of said ones of said data records as function of said time stamp parameter.

19. The main memory database system as recited in claim 18 wherein said time stamp parameter adapts over a time period thereby to change a rate at which said ones of said multiple versions age.

20. The main memory database system as recited in claim 15 wherein said time stamp is contained within a version list entry, said version list entry containing pointers to related versions of said ones of said data records affected by said transactions.

* * * * *